(12) United States Patent
Kummetz et al.

(10) Patent No.: US 8,699,943 B2
(45) Date of Patent: Apr. 15, 2014

(54) MOBILE REPEATER SYSTEM AND METHOD HAVING GEOPHYSICAL LOCATION AWARENESS WITHOUT USE OF GPS

(75) Inventors: Thomas Kummetz, Forest, VA (US); Matthew Melester, McKinney, TX (US)

(73) Assignee: Andrew LLC, Hickory, NC (US)

( * ) Notice: Subject to any disclaimer, the term of this patent is extended or adjusted under 35 U.S.C. 154(b) by 0 days.

(21) Appl. No.: 13/485,207

(22) Filed: May 31, 2012

(65) Prior Publication Data

US 2012/0309293 A1   Dec. 6, 2012

Related U.S. Application Data

(60) Provisional application No. 61/492,923, filed on Jun. 3, 2011.

(51) Int. Cl.
*H04B 7/15* (2006.01)
(52) U.S. Cl.
USPC ........................................ 455/11.1; 455/404.2
(58) Field of Classification Search
USPC ................. 455/7, 11.1, 13.1, 15, 16; 701/220
See application file for complete search history.

(56) References Cited

U.S. PATENT DOCUMENTS

| | | |
|---|---|---|
| 3,628,147 A | 12/1971 | Makino |
| 6,408,180 B1 | 6/2002 | McKenna et al. |
| 6,459,881 B1 | 10/2002 | Hoder et al. |
| 6,490,460 B1 | 12/2002 | Soliman |
| 6,571,284 B1 | 5/2003 | Suonvieri |
| 6,642,894 B1 | 11/2003 | Gross et al. |
| 6,785,511 B1 | 8/2004 | Hengeveld et al. |
| 6,785,551 B1 | 8/2004 | Richard |
| 6,792,262 B2 | 9/2004 | Yamanaka et al. |
| 6,795,699 B1 | 9/2004 | McCraw et al. |
| 6,904,280 B2 | 6/2005 | Siegel |
| 6,952,158 B2 | 10/2005 | Kennedy, Jr. |
| 7,016,688 B2 | 3/2006 | Simic et al. |
| 7,020,701 B1 | 3/2006 | Gelvin et al. |
| 7,027,919 B2 * | 4/2006 | Bernesi et al. ............... 701/500 |
| 7,383,043 B2 | 6/2008 | Lee |
| 7,383,049 B2 | 6/2008 | Deloach, Jr. et al. |
| 7,457,584 B2 | 11/2008 | Baker et al. |

(Continued)

FOREIGN PATENT DOCUMENTS

| | | |
|---|---|---|
| EP | 2422459 A1 | 2/2012 |
| EP | 2434658 A2 | 3/2012 |

(Continued)

*Primary Examiner* — Tu X Nguyen
(74) *Attorney, Agent, or Firm* — Wood, Herron & Evans, LLP

(57) ABSTRACT

A repeater system and method for implementing within a mobile platform includes repeater circuitry configured for repeating signals between devices and signal sources such as base transceiver stations. The repeater circuitry has a plurality of configurable settings for controlling operation of the repeater circuitry. Movement sensors sense the movement of the mobile platform and controller circuitry is configured to use inputs from the movement sensors to determine a current path of the mobile platform and to compare the determined current path to the known path information for the mobile platform for determining the location of the mobile platform and repeater system to vary the configurable settings of the repeater system based upon the determined location. Other information such as identification information from a signal source or information from the mobile platform are also used to vary the configuration and configurable settings of the repeater system.

20 Claims, 6 Drawing Sheets

(56) References Cited

U.S. PATENT DOCUMENTS

| | | |
|---|---|---|
| 7,466,975 B2 | 12/2008 | Feher |
| 7,522,918 B2 | 4/2009 | Wachter et al. |
| 7,580,381 B2 | 8/2009 | Michelon et al. |
| 7,583,940 B2 | 9/2009 | Matsuura et al. |
| 7,593,688 B2 | 9/2009 | Pratt et al. |
| 7,610,050 B2 | 10/2009 | Sayers et al. |
| 7,626,960 B2 | 12/2009 | Muller |
| 7,738,836 B2 | 6/2010 | Alles et al. |
| 7,831,263 B2 | 11/2010 | Sheynblat et al. |
| 2002/0045461 A1 | 4/2002 | Bongfeldt |
| 2006/0287824 A1 | 12/2006 | Lin |
| 2008/0311848 A1 * | 12/2008 | Proctor et al. ............ 455/9 |
| 2009/0186632 A1 | 7/2009 | Kennedy, Jr. et al. |
| 2010/0081458 A1 | 4/2010 | Sheynblat et al. |
| 2010/0265848 A1 | 10/2010 | Kummetz et al. |
| 2010/0297397 A1 | 11/2010 | Chen |
| 2011/0009056 A1 | 1/2011 | Hanson et al. |

FOREIGN PATENT DOCUMENTS

| | | |
|---|---|---|
| JP | 2011019066 A | 1/2011 |
| SE | 519389 C2 | 2/2003 |
| WO | 9829962 A2 | 7/1998 |
| WO | 2008040972 A1 | 4/2008 |
| WO | 2010123645 A1 | 10/2010 |

* cited by examiner

MOBILE REPEATER SYSTEM AND METHOD HAVING GEOPHYSICAL LOCATION AWARENESS WITHOUT USE OF GPS

RELATIONS APPLICATIONS

This application is a non-provisional application that claims the priority of U.S. Provisional Patent Application No. 61/492,923, filed Jun. 3, 2011 and entitled "MOBILE REPEATER SYSTEM HAVING ABILITY TO DETERMINE GEOPHYSICAL LOCATION OF A REPEATER WITHOUT GPS RECEIVER", which provisional application is incorporated herein by reference in its entirety.

FIELD OF THE INVENTION

The invention relates to mobile communication systems, such as repeaters and distributed antenna systems generally and, more specifically, to wireless repeater systems (repeater or distributed antenna systems) that are used in a mobile environment, such as on a train.

BACKGROUND OF THE INVENTION

Repeaters, distributed antenna systems, and similar signal repeating systems are wireless communication systems that are used to extend coverage into areas where the radio frequency (RF) signal penetration from base transceiver stations (BTS's) is limited or not present. Those low signal or no signal areas might be inside buildings, in tunnels, shadowed areas that are behind mountains, underground train systems, and various other isolated areas. Generally, applications for such repeater communication systems are for situations where the repeater or distributed antenna system (DAS) is immobile and is mounted in a fixed location with respect to one or more base transceiver stations. In other applications, the area that has limited penetration of the RF signals is mobile. That is, the repeater or distributed antenna system is installed in a moving or mobile conveyance such as a train, ship, car, bus, or airplane.

A mobile communication system, such as a repeater or a DAS typically has various configuration parameters or operational settings that include, for example, filter definitions (Start and Stop frequency or center frequency and bandwidth, filter type), gain settings and/or set power level settings for each filter section, modem or communication settings, and general operational settings (On/Off). These settings must be adjusted at system initialization or set up to allow the repeater to operate properly with the donor BTS, or within the parameters of a certain service provider. The settings typically do not change regularly for fixed repeater systems once they are initially set or programmed.

For mobile repeater applications, such as a repeater system used to extend coverage inside a train car, the areas that the moving system is travelling through might not allow the repeater system to keep the same configuration or configuration parameters for proper operation. As the repeater moves from one cellular service coverage area to another, the established frequency sub-bands and standards available for network communication may change. For example, certain trains may travel between countries, and thus, may be exposed to or use BTS's that are configured for different bands and standards. Various other operational conditions may change as well, such as the downlink signal strength as the mobile repeater system moves with respect to the BTS. It would be desirable for a mobile communication system or other mobile RF transmission system to accommodate these changes as the train travels To this end, prior systems have attempted to use the global positioning system (GPS) to determine the location of the repeater system. However, GPS receivers are costly and typically require installation of additional antennas on the rooftop of the train or other mobile platform in which the repeater is installed. Installing a GPS external antenna on the rooftop of the train or elsewhere in the mobile platform may be difficult, which may add significant additional expense. Further, depending on the type of train, access to a mounting location for the GPS antenna may not be available. In addition, train tracks often go through tunnels, mountainous terrain, and/or urban canyons were GPS satellite reception itself is inadequate to provide the necessary location information for the repeater system.

Therefore, there is a need for methods and systems for determining the location of repeater systems for use in mobile platforms that do not rely primarily on GPS functionality or require additional external antennas to be mounted with respect to the mobile platform.

SUMMARY OF THE INVENTION

A repeater system for being implemented within a mobile platform, such as a train, includes repeater circuitry that is configured for repeating signals between at least one device, such as a mobile phone, and at least one signal source, such as a BTS. The repeater circuitry has a plurality of configurable settings for controlling operation of the repeater circuitry. Controller circuitry is configured for varying the configurable settings. Movement sensors are mounted with respect to the mobile platform and are positioned for sensing movement of the mobile platform, such as with respect to an initial location. Information for a known path travelled by the mobile platform, such as the track travelled by a train, is stored in memory. The controller circuitry is configured to use one or more inputs from the movement sensors to determine a current path of the mobile platform and to compare the determined current path to the known path information for the mobile platform. The location of the mobile platform and repeater system is then determined and the configurable settings are varied based upon the determined location.

Embodiments of the invention use identification signals from the signal source and/or information from the mobile platform for determining the location of the mobile platform. The plurality of configurable settings include at least one of filter settings, gain settings, network settings, activation settings, or mode settings that may be varied individually or as part of a set of configurable settings based on the determined location of the mobile platform and repeater system.

DETAILED DESCRIPTION

The examples disclosed herein of an adaptive repeater system in a mobile environment or implemented within a mobile platform are exemplary of the invention and do not limit the scope of the invention. One skilled in the art will recognize a variety of applications and embodiments of the invention from the disclosure herein. Illustration and discussion are for an exemplary repeater system, such as a repeater device or a distributed antenna system, but will also apply to other repeater systems that transmit, receive, and/or otherwise repeat communication signals between one or more signal sources (e.g., a BTS) and mobile devices or equipment (e.g., a mobile or cellular phone).

Figure 1:
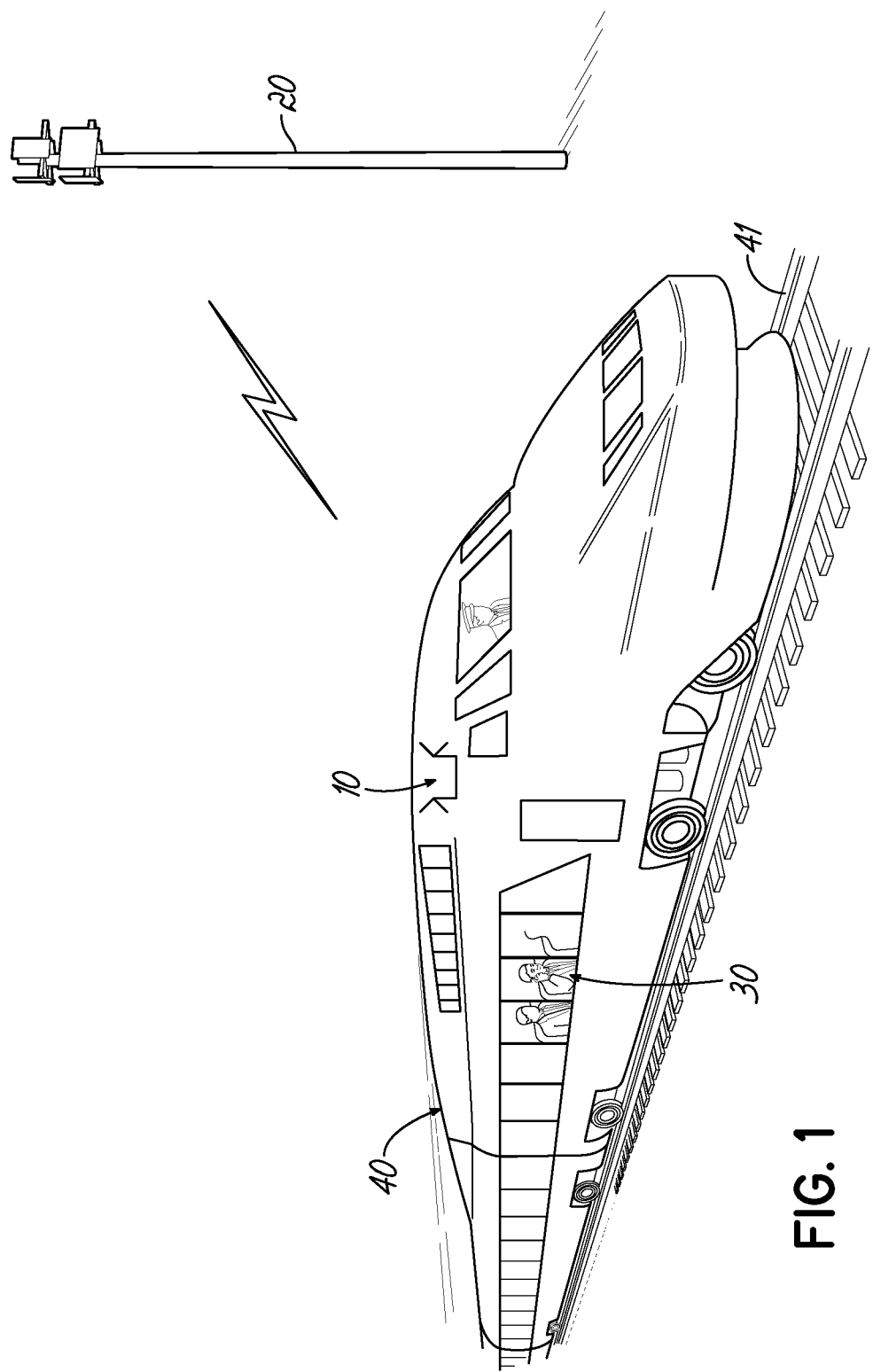
FIG. 1 illustrates a repeater system for use in a mobile environment and in a mobile platform in accordance with aspects of the invention.

FIG. 1 shows an exemplary mobile repeater system 10 that acts as part of a mobile communication network by facilitating communication between one or more signal sources of the network, such as a base transceiver station (BTS's) 20, and one or more mobile devices 30 (e.g., mobile phone, computer, etc.) that are in use in the mobile platform or moving environment, such as on a train 40. Train cars and other vessels used for transportation are often made of metal and other materials that shield the interior from external RF signals. The repeater system 10 receives the downlink signals from the BTS 20 and rebroadcasts—or repeats—the RF signals inside the passenger compartments of the train 40 at a level suitable for reception by the mobile device 30 so a user may interface with the network. The repeater system 10 also receives the uplink RF signals from the mobile device 30, and repeats those signals outside the train 40 at a level that allows the BTS 20 to communicate with the mobile device 30. That is, the repeater system provides bi-directional communication between one or more network signal sources and mobile devices. The repeater system 10 thereby extends or improves the cellular system coverage provided by the BTS 20 in the mobile environment, such as into the passenger compartments of the train 40.

Figure 2:
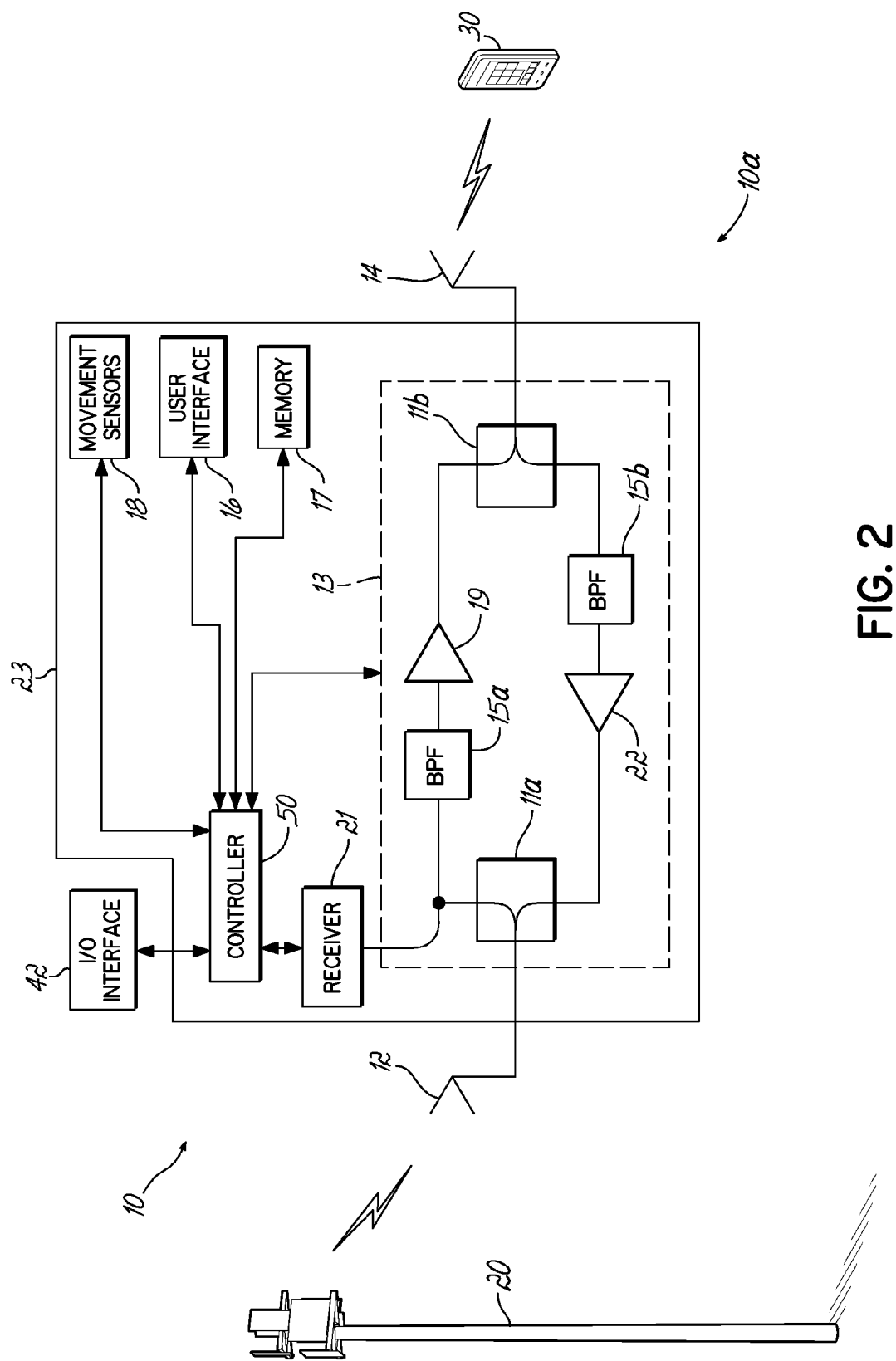
FIG. 2 is a diagram illustrating the components in an exemplary repeater system in accordance with an embodiment of the invention.

FIG. 2 illustrates a diagrammatic view of an exemplary embodiment of the mobile repeater system 10. The repeater system 10 in FIG. 2 is in the form of a repeater device 10a that has operational repeater circuitry that might be contained in a housing to be mounted within a mobile platform, such as in a train.

Figure 2A:
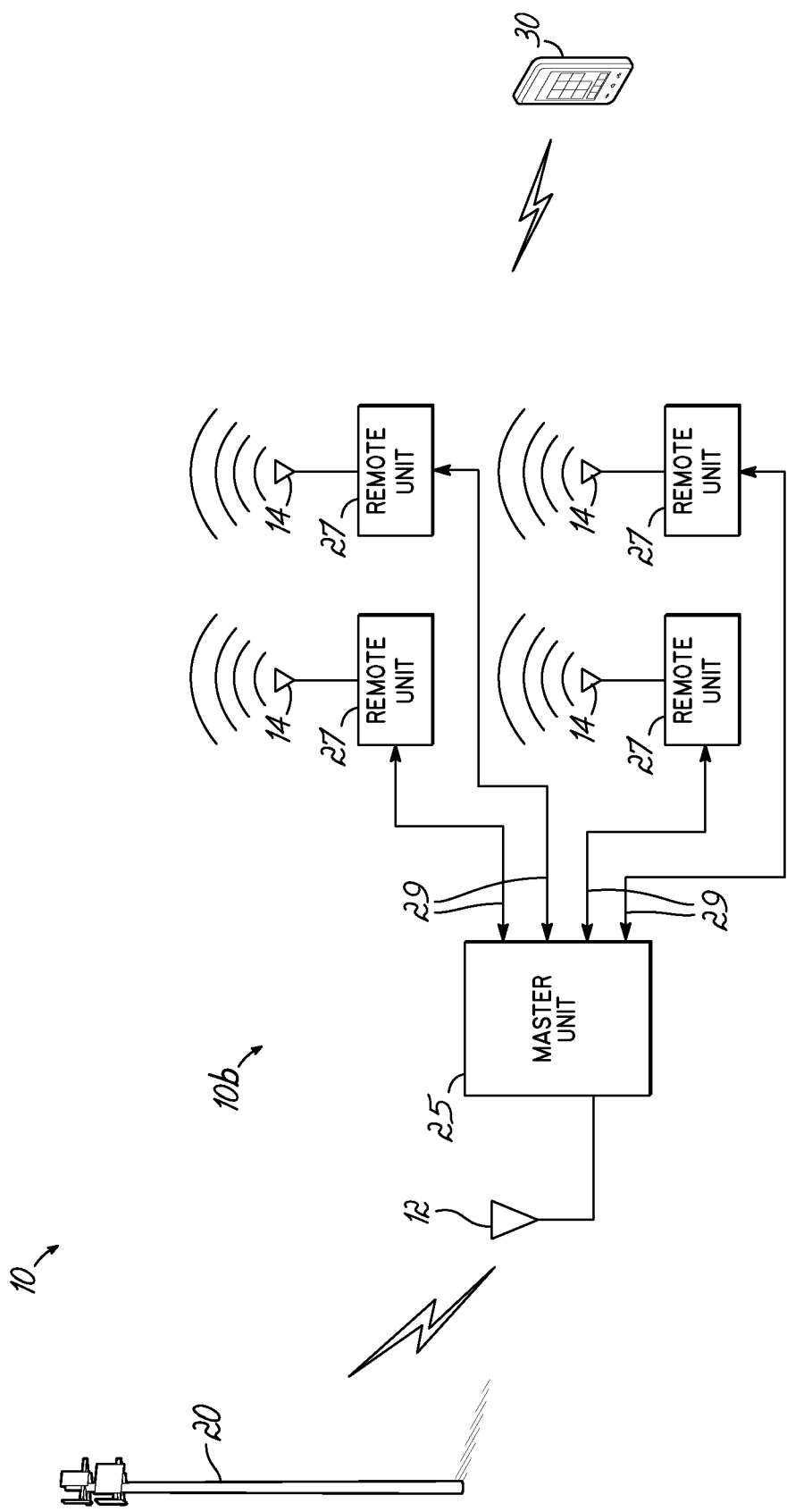
FIG. 2A is a diagram illustrating components of another exemplary repeater system in accordance with an embodiment of the invention.

Repeater device 10a, as illustrated in FIG. 2, has a donor antenna 12, a coverage antenna 14, and operational repeater circuitry 23 that couples the antennas 12, 14. In some repeater devices 10a, the electronics are contained within a unitary housing. Alternatively, the repeater system 10 of the invention might be implemented in a distributed system, such as a distributed antenna system (DAS) indicated specifically as system 10b, as illustrated in FIG. 2A and discussed below. In a DAS system 10b, the one or more donor antennas 12 are generally coupled to a main unit or master unit 25 that is coupled to a plurality of distributed remote units or antenna units 27, that are distributed throughout the mobile environment, such as in the different compartments or cars of a train, for example. The various remote units 27 are coupled to the master unit 25 with suitable communication links 29, such as coaxial or fiber-optic cables. The invention is described herein with respect to an embodiment where the various hardware components of the electronics for the repeater circuitry 23 are illustrated as located in a common location, such as a repeater housing or housing for a master unit, but it will be understood by those of ordinary skill in the art that the components might be distributed throughout the repeater system 10 as desired to implement the invention. Also, where single donor antennas and coverage antennas are illustrated, the repeater system 10 of the invention might implement multiple donor antennas and multiple coverage antennas on the donor and coverage sides of the system. The exemplary hardware configuration is described below with respect to the embodiment of FIG. 2.

The repeater system 10 includes controller circuitry 50, movement sensors 18, a user interface 16, memory circuitry 17, an input/output (I/O) interface 42, and one or more donor antennas 12. The donor antenna(s) 12 is operatively coupled to one or more coverage antennas 14 by a bi-directional amplifier circuitry 13. The bi-directional amplifier circuitry 13 is part of the repeater circuitry 23 that repeats signals between one or more signal sources (e.g., BTS) and one or more devices (e.g., mobile phone). The bi-directional amplifier circuitry 13 may include one or more duplexers 11a, 11b, downlink amplifier circuitry 19, uplink amplifier circuitry 22, and filter circuitry including bandpass filter circuitry 15a, 15b. The duplexers 11a, 11b separate the downlink signal from the uplink signal, which is typically in a different frequency band from the downlink signal, so that the signals may be separately processed by the bi-directional amplifier circuitry 13. Alternatively, multiple donor and coverage antennas coupled to separate uplink and downlink signal paths may be used without duplexers. Bandpass filter circuitry 15a, 15b may be configured so that only the desired frequencies that are to be repeated pass though the bi-directional amplifier circuitry 13. The bandpass filter circuitry 15a, 15b may be adjustable or configurable in accordance with the invention to thereby allow the repeater system to choose which cellular carriers, networks, and signal sources have their signals repeated inside the extended coverage area. Filter circuitry including bandpass filter circuitry 15a, 15b may also improve the performance of the repeater system 10 by reducing transmitted noise and other interference. The filter circuitry has configurable settings that may be varied in accordance with the invention, or might be otherwise varied, such as by an operator through user interface 16 and controller circuitry 50.

The controller circuitry 50 is operatively coupled to the bi-directional amplifier circuitry 13, and is configured for adjusting or varying one or more configurable settings for the different operational parameters or portions of the bi-directional amplifier circuitry 13 and other repeater circuitry based on information obtained from one or more combinations of the movement sensors 18, the user interface 16, the I/O interface 42, and/or memory circuitry 17. The configurable settings that are varied by the controller circuitry 50 may include, but are not limited to, the filter settings and/or operational frequencies of the filters 15a, 15b and the gain settings and/or gains of the amplifier circuitry 19, 22, network settings for the repeater circuitry 23, activation settings for the repeater circuitry and/or mode settings for the repeater circuitry. Additional settings for other configurable settings or parameters may also be varied or set by the controller circuitry 50. For example, in repeater systems 10 using multiple donor and/or coverage antennas 12, 14, the controller circuitry may also select which antenna to couple to the bi-directional amplifier circuitry 13 as a setting for an operational parameter.

As used herein, the terminal mobile platform refers to any sort of mobile environment, vehicle, apparatus, or structure, that is in motion with respect to a stationary reference, such as one or more BTS signal sources. In the exemplary embodiment illustrated in the present invention, one typical mobile platform is a train. However, the present invention is not limited to just trains. Rather, other mobile platforms, such as ships, cars, busses, or airplanes might serve as a suitable mobile platform. Furthermore, a mobile platform may be something other than a vehicle, and so the invention is directed to addressing the need to reconfigure the operation of a repeater system that is in motion with respect to one or more stationary signal sources, such as BTS's.

To provide downlink signal coverage inside the train, the donor antenna(s) 12 receives signals from one or more donor BTS's 12 or signal sources. The donor antenna 12 is electrically coupled to the donor side duplexer 11a, which directs the downlink signals to the appropriate downlink filter circuitry, such as downlink bandpass filter circuitry 15a. Noise and signals which are outside the frequency band of the cellular provider operating the BTS 20 may be filtered out by the downlink bandpass filter circuitry 15a. The downlink bandpass filter circuitry 15a may thereby reduce system interference, and may also block mobile devices 30 within the extended coverage area from using undesired cellular systems. The filtered signal is amplified by the downlink amplifier circuitry 19 to a sufficient level to complete the downlink path. The output of the downlink amplifier circuitry 19 circuitry provides the amplified signal to the coverage antenna 14 through the coverage side duplexer 11b. The downlink signal from signal source 20 is thereby provided to the extended coverage area with sufficient power to complete the downlink path between the BTS 20 and one or more mobile devices 30 in the train.

Improved uplink coverage is provided in a similar manner by the repeater system 10. The coverage antenna(s) 14 receives signals that are transmitted by the mobile devices 30. These signals are provided to the uplink bandpass filter circuitry 15b by the coverage side duplexer 11b. The filtered signals are amplified by the uplink amplifier circuitry 22, which provides signals with sufficient strength to the donor antenna 12 through the donor side duplexer 11a to complete the uplink path to the BTS 20.

As the train 40 travels from one location or region to another along the path of a track 41, the settings further required for the required operational parameters of the repeater system 10 may change. For example, the frequency spectrum utilized by the desired cellular carrier or network in one region, country, or major trading area (MTA) may change as the train crosses regional boundaries. Therefore, in order for the repeater system to operate properly as the train or other mobile platform moves, the controller circuitry 50 may need to periodically vary one or more of the configurable settings of the repeater circuitry, such as the operational frequencies of the filter circuitry 15a, 15b as well as the gain of the amplifier circuitry 19, 22 based on the determined location of the train 40.

In one aspect of the invention, the controller circuitry is configured for using an initial location of the mobile platform to then determine a current location. The initial location and velocity of the train 40 may be manually entered through the user interface 16, or it may be calculated by the controller circuitry 50 using information known about the start of the train along the known path of the train track 41. Because the movement of the train 40 is restricted to a pre-determined and known path defined by the track 41, the movement of the train 40 will follow an expected and repeated path or pattern as it moves over the same sections of the track. In accordance with one aspect of the invention, the controller circuitry 50 determines the location of the train by detecting or determining the current path of the train over a period of time. The detected or determined path may contain sequences of curves, segment lengths, and altitude changes that provide a unique signature for the path. By comparing this unique signature of the determined path with a stored or digitized map of the track or a known path for the train, the controller circuitry 50 may determine the location of the train and repeater system from the deviation from the initial or baseline location of the train without requiring a GPS signal for the repeater system. In one example, the controller circuitry 50 may correlate the detected or determined current path of the train 40 having the unique signature with the known path including information for the known path, such as sections of the track that are known and stored in memory circuitry 17. Using the correlation, a match is found between the determined current path and the known path and this data provides location information for determining the location of the repeater system and for varying the configurable settings for the operational parameters of the repeater. Advantageously, this method may allow the controller circuitry 50 to determine the location of the train 40 without requiring any external input to the repeater circuitry 10, such as signals from a GPS receiver.

The present invention may be implemented by execution of suitable control software by the controller circuitry 50 of the repeater system. The repeater circuitry 15 of the invention, and specifically controller circuitry 50, will include one or more processors and suitable memory circuitry like circuitry 17 for the execution of software as appropriate to control the operation of the repeater system 10. The processor hardware of controller circuitry 50 may include one or more microprocessors, digital signal processors, or other processing units or logic circuits to execute software stored in memory, such as read-only-memory (ROM) or random access memory (RAM), or other memory to control the repeater system. The software and software applications or program code are executed to provide the functionality of the invention as described herein.

To determine the current location of the train 40, the controller circuitry 50 starts with the known initial location or baseline location, such as the location of the starting train station, and updates the position or location of the train 40 based on the information obtained from the various motion or movement sensors 18 with respect to the initial location. The initial location may be part of the known path information stored in appropriate memory circuitry like memory circuitry 17.

The various motion or movement sensors 18 collectively provide information regarding the motion of the train that may then be translated into current path information and a determined location based upon correlation with a known path or map of the track that the train is moving on. As will be appreciated, digitized maps for all possible tracks that the train could travel on might be maintained by the repeater system for such correlation. Movement sensors might include, for example, a gyroscope for detecting the change of direction for three orthogonal directions of the train or mobile platform. An accelerometer might also be used as a movement sensor for determining the change of speed for three orthogonal directions for train 40. A compass might also be used as a movement sensor or for determining direction with respect to a magnetic north pole. Other movement sensors might detect other conditions that vary with movement, such as an altimeter for determining altitude or atmospheric pressure. While various movement sensors 18 are discussed in the examples herein, it will be understood that other types of sensors and information might be utilized for the purposes of determining location information for the repeater system based upon the movement of the train along a known track.

In accordance with one aspect of the invention, the controller circuitry of the repeater system is configured to use inputs from one or more movement sensors to determine a current path of the mobile platform. For example, the movement sensors may provide information regarding the movement of the train 40 from an initial location. Starting at the initial location, in monitoring the movement of the train, the controller circuitry is configured to determine a current path of the train. The current path of the train that is determined by the controller circuitry is then compared to information about a known path for the train for determining the location of the train and the repeater system mounted therewith. In accordance with another aspect of the invention, based upon the determined location of the train and the repeater system, the controller circuitry varies one or more configurable settings for the repeater system so that it may operate properly at the current determined location for the train and repeater system. The present invention, therefore, has the ability to adapt to its surroundings as the train or other mobile platform moves between different communication networks, different geographic locations, such as different countries, and otherwise moves from one operating condition to another operating condition.

The movement sensors 18 may include a three axis accelerometer to provide the controller circuitry 50 with signals proportional to the acceleration of the train 40 in three orthogonal axes or directions. The controller circuitry 50 may then determine changes in the velocity and position of the train 40 by performing an appropriate number of integrations on the accelerometer signals. The current location and path of the train can then be determined by adding the calculated positional changes to the known initial or previous start location. After the current position and path of the train has been determined, the controller circuitry 50 may continue to compare and correlate the movement of the train 40 with the known path information for the track to maintain and further refine positional accuracy to determine the current location of the train or mobile platform. Under certain conditions, such as when the train 40 approaches a railroad junction, the controller circuitry may lose track of the current position of the train 40. For example, if the train is approaching a junction, it will be necessary to determine which path was taken. Therefore, the invention might correlate the movement information from the movement sensors using a limited correlation trace length to determine the path taken. If the current position of the train is determined to be unreliable, the controller circuitry 50 may reset the location of the train by determining a new initial or baseline location or position based upon location information associated with a new station, for example, or some other landmark. This may be accomplished by comparing unique portions of the determined or detected current train path to the digitized or known path or track map as previously discussed.

To further assist the controller circuitry 50 in determining the location or position of the train 40, a plurality of movement sensors 18 may be employed to provide inputs to the controller circuitry, as noted. For example, one or more gyroscopes, accelerometers, and/or magnetic or electronic compasses may be used to detect changes in the direction or orientation of the train 40. A barometric or pressure sensor or altimeter may be used to estimate the altitude of the train 40. The additional information provided by these multiple movement sensors and inputs might be used by the controller circuitry 50 to further refine the estimated location or position of the train 40. For example, changes in the direction of the train may be detected by gyroscopic sensors. These changes in direction may then be compared to known path information like known curves in the track contained in the digitized track map to determine or refine the location or position of the train. As yet another example, the altitude of the train 40 might be determined by the controller circuitry 50 from the output of the pressure sensor or altimeter. To improve the accuracy of the altitude estimate, the output of the pressure sensor/altimeter might be averaged or otherwise filtered. This averaging or filtering might be used, for example, to compensate for transient pressure changes inside the train 40 due to air conditioning system cycling or due to the train entering or leaving a tunnel. Once the controller circuitry 50 has determined the estimated altitude of the train 40 as part of the current location and path of the train, the altitude could be compared to known path information such as altitude data in the digitized track map as a check on, or to improve the accuracy of, the estimated location or position of the train 40.

In accordance with another aspect of the invention, the known path information, such as a digitized track map, may also include additional path information. For example, information about speeds associated with one or more sections of a path, such as information regarding recommended, minimum, and maximum speeds for a given type of train or section of track, might be used by the controller circuitry. The positions or locations of train stations and railway signals in the path or associated with the path might also be used by the controller circuitry. This additional information may also be used to improve the accuracy and to confirm the current location or estimated position of the train 40. By way of example, those times when the train velocity drops to zero might be correlated to known positions of train stations, railroad signals, and/or crossings on the known path or track where a train would stop. Times for scheduled stops in the path might also be used as additional path information. For example, these stops could be further compared to a known train schedule stored in memory 17 for the known path or track. A clock internal to the repeater system might thereby allow the controller circuitry 50 to compare the absolute time at which the train 40 is stopped with the expected scheduled stops stored in memory 17. By comparing the stop times to the known train schedule for that track, the controller circuitry 50 may be able to further refine the determined location of the train 40. The repeater system 10 might also include cellular system receiver circuitry 21, which might provide a system time broadcast by the BTS 20 to synchronize the internal repeater system clock. Similarly to periods of zero velocity, or stops, variations between the measured speed of the train 40 and the expected speed from the known path map information for a particular section of track could be used to determine if the estimated or determined location is in error. Therefore, the controller circuitry 50 is configured to use the additional path information for determining the location of the mobile platform in accordance with the invention.

In accordance with another aspect of the invention, the signal sources that interface with the repeater system 10 as it travels along a path are capable of providing identification information that identifies the signal source. The controller circuitry is configured for using the identification information for determining the location of the mobile platform. For example, further positional information might be obtained through the receiver circuitry 21 by decoding identification information broadcast by signal source BTS 20. The BTS 20 may communicate its location (either its absolute position or its location relative to the repeater) using coordinate signals such as GPS coordinates that are transmitted by the BTS 20. For example, a CDMA system BTS typically includes a GPS for system synchronization purposes and transmits the location coordinates of the BTS 20. The BTS 20 may also communicate other identification information, such as mobile device transmit slot timing advance information, which may provide an estimate of the distance between the repeater system 10 and the BTS 20. The location coordinates of the BTS 20 may then be used and compared against a list of coordinates in memory circuitry 17 to assist in determining the location of the train and repeater system 10. The BTS 20 might also provide information about the frequency of the signal source, such as information on the cellular system transmitting and receiving frequency bands, for the particular BTS network configuration, information about neighboring BTS's, and other information relevant to the configuration of the repeater system 10. This information may be conveyed by a broadcast control channel associated with the BTS 20, for example. The controller circuitry 50 might also compare the broadcast identification information with a database of BTS locations to determine the location of the nearby BTS's 20.

Where the identification information and location information is not broadcast directly, the BTS 20 might also be identified by a broadcast ID or any other suitable identifying parameters. Such parameters may include, but are not limited to, a beacon channel number or frequency, base station identity code (BSIC), or location area code (LAC), which could be used to identify the signal source, such as BTS 20. The known location of detected and identified BTS's 20 might be used by the controller circuitry in conjunction with data indicating the distance from the BTS 20 as an additional system data point to trilaterate the location or position of the train 40 and repeater system. If transmit slot timing advance data is not available to determine the distance, the distance between the train 40 and the BTS 20 might be estimated based on received signal strength. To perform this calculation, the controller circuitry 50 might assume a suitable BTS transmit power and path loss constant, such as n=2 for free space, or n=2.5 to 3.5 in an open space. To improve the accuracy of the distance measurement, an appropriate value of n could be selected based on the terrain associated with the position of the train 40 and stored in memory circuitry 17 along with the other known path information, such as digitized track map information. Armed with the known location of three or more BTS's and estimates of the distance of the BTS's from the train 40, the controller 50 may trilaterate the position of the train. Trilateration might thereby be used to determine the initial location or baseline position (starting train station)—as well as to confirm the current location or position—of the repeater 10.

In accordance with another embodiment of the invention, the controller circuitry 50 may be linked to various external devices or sources using appropriate input/output (I/O) interfaces 42 for providing the system with additional information that is used by the controller circuitry for determining the location of the mobile platform and repeater. Additional methods of refining or determining the location or position of the train 40 may thereby be employed that use information obtained from outside sources. The external information might include the speed of the mobile platform, the proximity of the mobile platform to a station, the proximity of a mobile platform to a signal source, or the direction of a driver of the mobile platform. For example, the controller circuitry 50 might be configured to receive information from the mobile platform, such as the train regarding train speed, status of the doors (open/closed), proximity to specific railway signals, the proximity to train stations, and/or the current direction of the train drivers. This additional information might then be used to confirm the determined location or estimated position of the train. For example, the current direction of the train drivers might be compared to the orientation of the train 40 as indicated by the compass sensors to verify the direction of travel and location on the track.

Trains 40 typically have more than one repeater system 10, with a single repeater system 10 covering one or two cars. In trains 40 having multiple repeater systems 10, the location or position of the train 40 as determined by the individual repeater systems 10 might be provided to one or more of the controller circuitry elements 50 of the repeater systems. The controller circuitry 50 then compares the individual determined train locations or positions reported by each repeater system 10 to produce an average. The reported train locations or positions might also be compared to determine if one of the determined and reported repeater locations or positions differs significantly from the other reported repeater locations or positions. An outlying determined location or position reported by one of the repeater systems 10 might indicate that the offending repeater system 10 is malfunctioning or that the initial location or position of the offending repeater system 10 needs to be reset, or otherwise corrected.

As noted above, various information about the known path travelled by the mobile platform may be used by the invention. For example, information regarding the known schedule of the train might also be made known to the repeater system. The schedule can then be compared to the time of a detected stop, that is detected utilizing the movement sensors 18 of the invention. Comparing the time of the detected stop associated with a current determined path with the scheduled stop is an additional feature of the invention for determining the initial position of the train and repeater, as well as to confirm the determined position while moving. Generally, the clock of the repeater system will be synchronized with an external reference clock system for improved accuracy in the invention.

In accordance with one aspect of the invention, a determined location or position of the train 40 reflective of the geographic location of the repeater system 10 may be used to configure or reconfigure the repeater system 10. The repeater circuitry has a plurality of configurable settings. For example, when the repeater system 10 determines that it is passing from one country, MTA, or region to another country, MTA, or region, the controller circuitry 50 may vary one or more configurable settings, such as to adjust the pass band frequencies of the adjustable bandpass filter circuitry 15a, 15b and the gain of the amplifier circuitry 19, 22. These adjustments or variations to the configurable settings may allow the repeater system 10 to adapt to changes in the frequency spectrum and transmit power used by a preferred carrier in different regions.

In one embodiment, the export, import, and the display or viewing of the operating conditions for the repeater system, such as cartographic boundary files or carrier frequency bands, may be accessible through the user interface 16 associated with the repeater system 10. In determining the existence of certain operating conditions, the controller circuitry 50 of repeater system 10 may provide verification and error checking. For example, there may be a check performed on whether a particular number is within an allowed range or whether a cartographic boundary file constitutes an unsegmented area. Where a cartographic boundary is used in conjunction with the user interface 16, a cartographic boundary may be used in conjunction with a map file or other stored known path information as a background for orientation purposes.

Based on the determined location or position of the train 40, the repeater system 10 thus adapts its operation or varies or changes its configurable settings and configuration to adapt to the new conditions. That is, certain location information as determined by the invention may result in a change in the configurable settings and configuration of the repeater system 10. Generally, in one embodiment, the adaptation is automatic and based upon the sensing of a significant change in the location, such as crossing a regional boundary. The controller circuitry 50 may implement such adaptation or change in the system by varying or adapting one or more of the various configurable settings of the circuitry of the repeater system. Certain configuration changes or configurable settings for the repeater circuitry may include, for example:

Filter settings, such as setting the system or repeater filter(s) or filter circuitry to reflect certain bands and sub-bands and the filter type.

Gain settings, such as setting the system or repeater gain values (or the power level) of the amplifier circuitry for different frequency sub-bands/filter sections.

Network settings, such as configuring the transmission properties, including network details of the system.

Activation settings, such as activating or deactivating certain system or repeater functions, including signal transmission.

Mode settings, such as entering specialized modes, such as the use of a fast gain tracking algorithm using RSSI or pilot data at higher speeds.

Other configurable settings might be varied or changed and the present invention is not limited to one or more particular settings. In addition, the location information may be used in conjunction with other information to determine the desired configuration of the repeater system 10. There are multiple ways to implement the use of location information and condition inputs and data to adaptively configure the repeater system 10. In one embodiment, the configurable settings are arranged as a set or in a configuration file and each configuration file that may be selected includes a complete set or list of the configurable settings or parameters for the repeater system 10. In another embodiment, one or more selectable configuration files or sets may include only a subset of the configurable settings or parameters. In such a subset case, the repeater system 10 may revert to default settings and parameters for those configurable settings not included specifically in the set or configuration file. Alternatively, the repeater may leave configurable settings that are not included in an implemented set or configuration file in the same condition as they were in before the new set or configuration file was implemented and the system was adapted or reconfigured. That is, only some of the configurable settings or parameters might be adapted while other settings might remain the same or change to a default condition.

A condition set for causing adaptation and variation of the configurable settings may include a single condition or multiple conditions for the variation. Multiple conditions may be arranged in a logical argument fashion for selective adaptation. For some condition sets, satisfying at least one condition may satisfy the entire condition set (such as a logical "OR" series). For other condition sets, satisfying the condition set may require satisfying every condition in the set (such as a logical "AND" series). Other condition sets may be satisfied by other logical combinations of conditions as will be understood by a person having ordinary skill in the art, such as, for example, some OR conditions combined with one or more AND conditions. To that end, the controller circuitry 50 may implement a series of condition sets in a particular order to determine when and how to adapt or configure the repeater system 10. As will be understood by a person having ordinary skill in the art, the invention is not limited to particular sets of conditions or the order such sets and conditions are utilized for the purpose of adaptation.

Figure 3A:
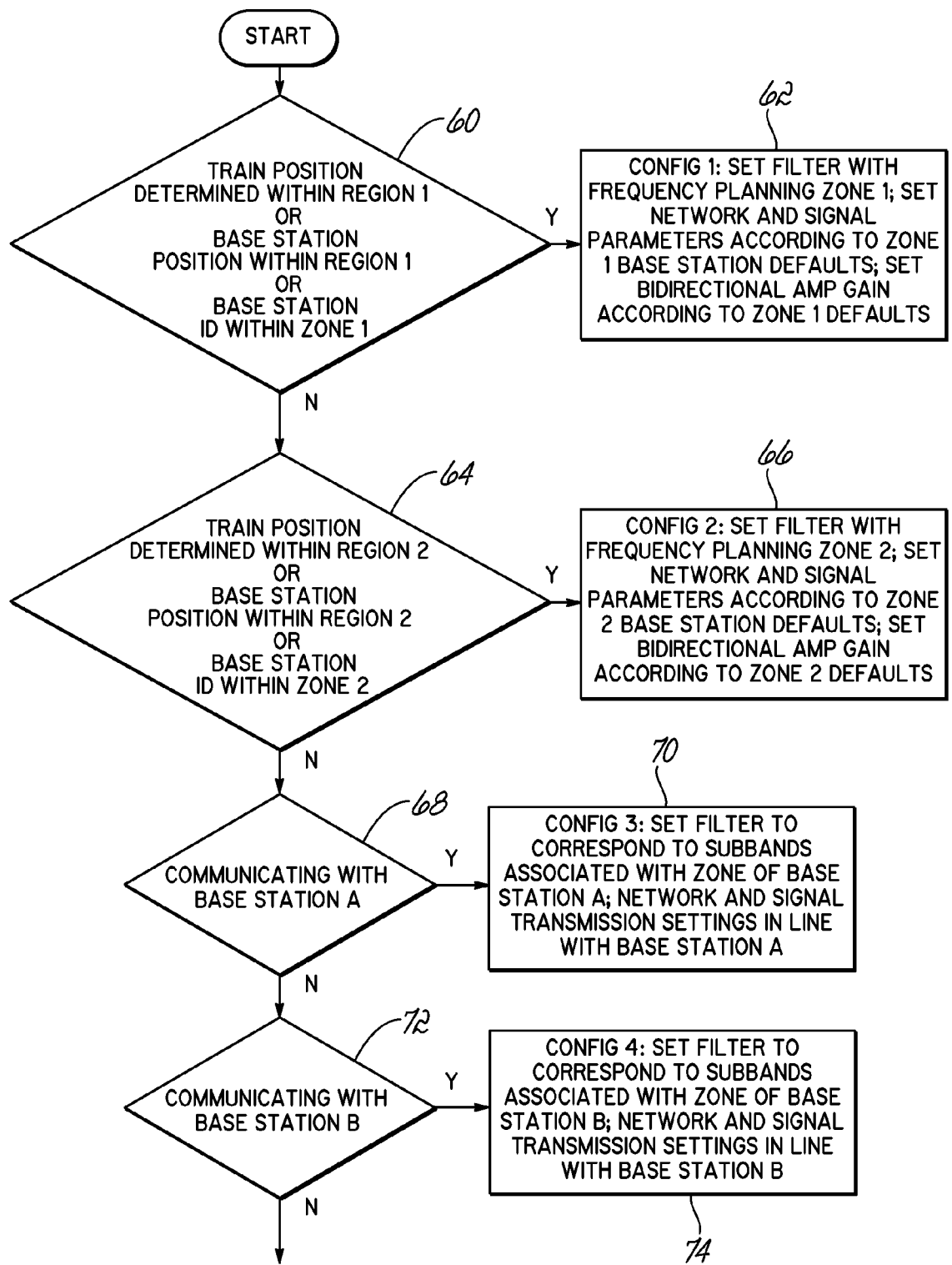
FIGS. 3A and 3B are a flowchart illustrating an exemplary process for selectively varying or adapting a repeater system configuration in accordance with an embodiment of the invention.
Figure 3B:
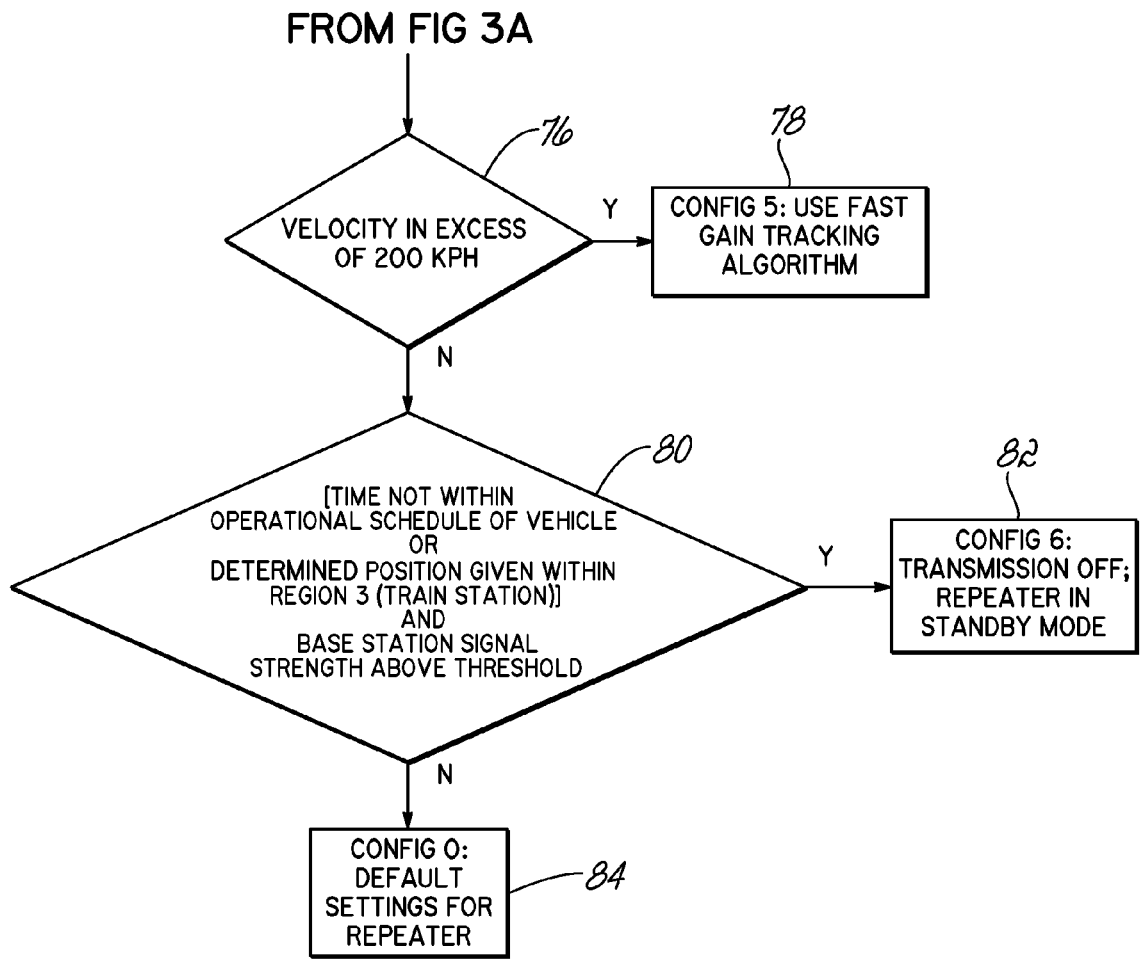

FIGS. 3A and 3B illustrate an exemplary method for processing a series of condition sets and implementing an operational configuration with variation configurable settings according to the location of the train 40 and repeater system, as detected by the repeater system 10, according to the invention. As shown, the method includes different condition sets associated with a location of the repeater system within specific frequency planning zones, communication by the repeater system with specific BTSs, a vehicle moving at high travel speeds, and conditions where the repeater does not need to transmit. The method illustrated in FIGS. 3A and 3B is only one exemplary logic process and does not limit the scope of the invention. A variety of different conditions may result in a variety of different configurations for varying the configurable settings. A variety of logic operators, inputs, and evaluative criteria may be used to determine which configuration or configurations to use, and which configurable settings to vary.

In the FIGS. 3A-3B, various logical criteria are set forth for adapting or configuring the repeater system in accordance with the invention. For example, in block 60, the repeater system 10 may determine the location of the train 40 and the mobile environment and/or the position or location of the BTS 20 with which the repeater system 10 is currently operating. For example, the controller circuitry 50 may determine the repeater system is in a particular cartographic region (e.g., within region 1). Or, the controller 50 may determine that the repeater system 10 is interfacing with a BTS located within region 1. Alternatively, as shown in block 60, the BTS ID, which may be reflected in the particular mobile country code (e.g., MCC=228), or a mobile network code (e.g., MNC is found in the list 01, 02, 03, 04, 05, 06, 07, 08, 50, 51) may indicate that the BTS is within a defined zone (e.g., zone 1). If at least one of such conditions is met affirmatively, then the repeater system might be adapted or configured with the configurable settings of configuration 1, as indicated by block 62 in FIG. 3A. That is, configuration 1 is selected based upon the inputs/data regarding location and/or other operating conditions. The one or more configurable settings associated with the configuration are used to adapt the system. That is, the settings for the filter circuitry might be set with respect to a particular frequency planning zone 1. Also, the network and signal parameters might be set according to zone 1 BTS defaults.

Alternatively, if the conditions from the condition set reflected in block 60 are not met, a further test might be made to determine whether the conditions from another condition set are met, such as from the condition set indicated by block 64. As illustrated, current operating conditions, location, and/or inputs might be evaluated to determine if the repeater system is operating in a location of a different region. If so, the repeater system might be configured or adapted according to the configurable settings of the configuration 2 set forth in block 66. That is, configuration 2 is selected. Alternatively, as indicated by blocks 68 and 72, the data available to the repeater system 10 might be processed, and thereby indicate that the current operating conditions show that the repeater is currently communicating with a particular BTS (e.g., BTS A, BTS B). If the repeater system is communicating with BTS A, configuration 3 might be utilized as set forth in block 70 of FIG. 3A. Alternatively, configuration 4 might be utilized as set forth in block 74, when the computer system is communicating with BTS B. As noted above, various BTS information, such as network ID codes, BTS coordinates, signal properties, and other input/data information, might be utilized to determine the identity of a particular BTS 20 communicating with the repeater system 10.

If previous condition sets are not met based upon evaluation of the operating conditions, still other conditions, such as environmental conditions, might also be monitored. For example, as in block 76 shown in FIG. 3B, information regarding the velocity of the repeater system 10 might be determined. If the velocity of the train housing the repeater is in excess of 200 km/hour as indicate by block 76, configuration 5 might be utilized, as shown in block 78, so that the repeater system 10 may use fast gain tracking algorithms for proper interfacing with the BTS 20. Still other conditions might be tested, as shown in block 80. For example, the location of the repeater system mobile platform, such as the operation or movement of the vehicle housing the repeater might be determined to determine if the repeater system is in motion. If the current time does not indicate an expected location or operational status of the vehicle according to an operational schedule, or if the determined position indicates that the train is within the boundary of a stationery location such as a train station, and the BTS signal strength is above a threshold, configuration 6 might be utilized as shown by block 82 in FIG. 3B. In that case, the uplink gain might be reduced to 0 dB or less, which may turn the transmission OFF and place the repeater system in standby mode. If none of the various condition sets are met, a default configuration, or configuration 0 might be used as shown in block 84 to set the default settings for the repeater system.

In one embodiment, the user interface 16 of the repeater 10 is operable to enter, view, and modify both the conditions of the condition sets, the sets themselves, and configuration files used to adapt the configurable settings of the repeater system 10. Alternatively, the repeater system 10 may receive condition sets and configuration files input by a centralized controller or other external source or device, such as a laptop computer connected through the I/O interface 42. Condition sets and configurations and configuration files are easily edited or changed, such as through the user interface 16 or I/O interface 42, to suit the mobile environment in which the repeater operates. The configuration files may contain information or data regarding at least one of the configurable settings for the repeater system.

In one embodiment, the configuration or adaptation with the configurable setting values could be set entirely by the determined location of the repeater 10. The logic control in that case could include multiple levels of configuration for different location conditions. Within the vicinity of a specific coordinate (such as a train station, harbor, BTS, tunnel, airport, bus station, or the like), a configuration specific to that location may be used. For example, if the repeater is at coordinates xy1, use configuration 100, or if it is at coordinates xy2, use configuration 200. Outside of such specific points but within a zone defining a particular region (such as a metropolitan area), a region-specific configuration may be used. For example, in a zone defining a city or metropolitan area, different configurations are used. Outside of a region but within a country or state, a configuration appropriate to that country or state may be used. Outside of any defined cartographic boundary, a default configuration may be used. In that way, multiple levels of geographic zones are use. Any appropriate logic set can be used to match configurations to any appropriate set of determined conditions and controller circuitry 50 may be configured in that way.

Conditions, condition sets, and related configuration files for the configurable settings may be stored in memory circuitry in any appropriate format. The memory circuitry might exist as memory circuitry 17 on the system or might be external and accessed by the system by an appropriate interface, such as I/O interface 42. In one embodiment, condition sets for the configurable settings may be stored and processed as XML files. Configuration sets or files for use in the invention may be generated externally with some specific editor. Then, upon certain conditions or condition sets being met, as determined by the inputs to I/O interface 42 and controller circuitry 50, a particular configuration set or configuration file might be selected. The configurable settings may then be varied and selected according to that configuration or configuration file. The repeater system 10 might be set up or configured for a particular set of conditions. That configuration set may then be stored under a particular file name and then subsequently accessed upon the need to vary or adapt the repeater system and its configurable settings based on current location or other operating conditions. The various export, import, and display of the various configuration sets and files may be implemented utilizing the user interface 16. Cartographic boundary information and known path or track information may also be stored and evaluated using a geographic shape file. For example, a shape file such as the ASCII format file on the census.gov website might be used. Other formats, such as the formats offered by common geographic information system (GIS) software might be used. Shape files are also available, as would be understood by a person of ordinary skill in the art, and can be utilized in embodiments of the invention.

The repeater system 10 and controller circuitry 50 might also be configured so that the repeater system logs each configuration as it is used, with each log entry including the time and date (time-stamp), the configuration in use, and the conditions that triggered the use of that configuration, such as the geographical location or position that caused the variation or adaptation. The determined location or position of the train may also be used to tag logging information so that conditions or alarms may be correlated with a particular location on the track. A person of having ordinary skill in the art of cellular system and mobile device engineering will appreciate the addition of a variety of functional features that follow from the present disclosure.

Figure 4:
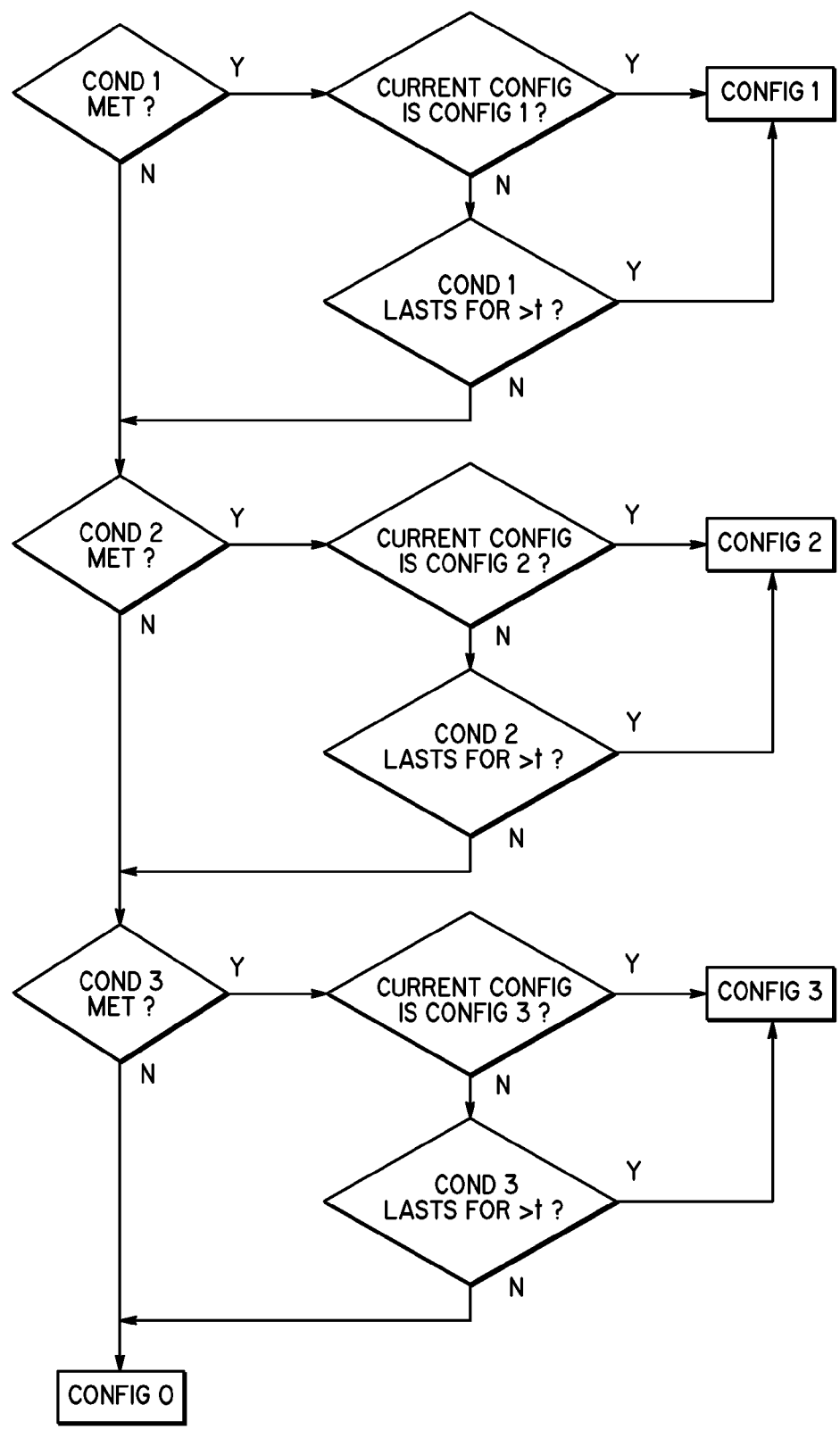
FIG. 4 is a flowchart illustrating another exemplary process for selectively varying or adapting a repeater system configuration including a hysteresis provision in accordance with an embodiment of the invention.

The logic used by the controller circuitry 50 to determine when to alter the repeater configuration may include a hysteresis loop or other programming to reduce or prevent oscillation between configurations when the system is near a condition boundary. In that regard, the condition or location determined for the mobile platform that would implement a change in the configuration and configurable settings must last for a particular amount of time (t). Hysteresis may include, for example, a minimum time (t) spent in each configuration before the configuration and the configurable settings can be changed. FIG. 4 illustrates the addition of a logic step in the control process that requires that a new operating condition be met consistently for a period of time (time>t) before the configuration of the repeater will change.

Accordingly, the invention replaces the GPS functionality within a repeater system, such as a mobile repeater or distributed antenna system. This eliminates the problem of GPS receivers that have been shown to be reporting incorrect location information in somewhat frequent cases within a mobile environment, such as within a train. As such, this invention is particularly useful for in-train repeater systems. With the invention, the location errors do not depend on the obstruction of signals from GPS satellites. Therefore, the location accuracy can be improved. Furthermore, the location functionality of the invention is less expensive to implement compared to current solutions using GPS receivers and also requiring a GPS antenna to be placed and installed on the coach roof of a train, and a GPS antenna RF cable installed to the repeater system in the train.

Although the disclosure herein discusses use of the invention with regard to a repeater installed on a train, these same methods can be applied to base stations, distributed antenna systems, and other types of RF transceivers and communication systems that operate in mobile environments.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A repeater system for implementing within a mobile platform, the repeater system comprising:
    repeater circuitry configured for repeating signals between at least one device and at least one signal source, the repeater circuitry having a plurality of configurable settings for controlling operation of the repeater circuitry;
    controller circuitry configured for varying at least one the configurable settings;
    at least one movement sensor positioned for sensing movement of the mobile platform;
    memory circuitry that stores pre-existing information for a pre-defined and known path that is to be travelled by the mobile platform;
    the controller circuitry configured to use an input from the at least one movement sensor to determine a current path of the mobile platform as it is moving and to compare the determined current path of the moving mobile platform to the pre-defined and known path information for the mobile platform for generally continuously determining the current location of the mobile platform and repeater system as it is moving along the pre-defined and known path; and
    the controller circuitry varying the at least one configurable setting based upon the determined current location along the pre-defined and known path.

2. The repeater system of claim 1 wherein the controller circuitry is further configured for using an initial location of the mobile platform in combination with the input from the at least one movement sensor to determine the current path for the moving mobile platform.

3. The repeater system of claim 1 further comprising a plurality of movement sensors, the controller circuitry configured to use inputs from the plurality of movement sensors to determine a current path of the moving mobile platform.

4. The repeater system of claim 1 wherein the movement sensor includes at least one of a gyroscope, an accelerometer, a compass, a pressure sensor or an altimeter.

5. The repeater system of claim 1 wherein the information for a pre-defined and known path travelled by the mobile platform includes additional path information including at least one of speeds associated with a section of the path, locations of stations in the path, signals associated with the path, or times for scheduled stops in the path, the controller circuitry configured to use the additional path information for determining the current location of the mobile platform as it is moving along the pre-defined and known path.

6. The repeater system of claim 1 wherein the signal source is capable of providing identification information that identifies the signal source, the controller circuitry configured for using the identification information for determining the location of the mobile platform.

7. The repeater system of claim 6 wherein the plurality of configurable settings are arranged as a set, the controller circuitry configured for implementing the set of configurable settings based upon at least one of the determined location of the mobile platform and repeater system or the identification information that identifies the signal source.

8. The repeater system of claim 6 wherein the identification information includes at least one of location coordinates for the signal source, GPS coordinates for the signal source, information about the frequency of the signal source, a beacon channel number, a beacon channel frequency, a base station identity code, or a location area code.

9. The repeater system of claim 1 further comprising an interface with the mobile platform for receiving information from the mobile platform including at least one of speed of the mobile platform, proximity of the mobile platform to a station, proximity of the mobile platform to a signal source, or the direction of a driver of the mobile platform, the controller circuitry configured to use the mobile platform information for determining the current location of the mobile platform along the pre-defined and known path.

10. The repeater system of claim 9 wherein the plurality of configurable settings are arranged as a set, the controller circuitry configured for implementing the set of configurable settings based upon at least one of the determined location of the mobile platform and repeater system or received information from the mobile platform.

11. The repeater system of claim 1 wherein the plurality of configurable settings include at least one of filter settings, gain settings, network settings, activation settings, or mode settings.

12. The repeater system of claim 1 wherein the plurality of configurable settings are arranged as a set, the controller circuitry configured for implementing the set of configurable settings based upon the determined current location of the mobile platform and repeater system.

13. A method for repeating signals within a mobile platform, the method comprising:
    repeating signals between at least one device and at least one signal source using repeater circuitry located within a mobile platform, the repeater circuitry having a plurality of configurable settings for controlling operation of the repeater circuitry;
    sensing movement of the mobile platform and repeater system mounted therewith with at least one movement sensor positioned for sensing movement of the mobile platform;
    storing pre-existing information for a pre-defined and known path that is to be travelled by the mobile platform;
    determining a current path of the mobile platform as it is moving using an input from the at least one movement sensor;
    comparing the determined current path of the moving mobile platform to the pre-defined and known path information for a path travelled by the mobile platform;
    generally continuously determining the current location of the mobile platform and repeater system as it is moving along the pre-defined and known path based on the comparison; and
    varying at least one configurable setting of the repeater circuitry based upon the determined current location of the mobile platform and repeater system along the pre-defined and known path.

14. The method of claim 13 further comprising using an initial location of the mobile platform in combination with the input from the at least one movement sensor to determine the current path for the moving mobile platform.

15. The method of claim 13 further comprising sensing movement of the mobile platform and repeater system mounted therewith with a plurality of movement sensors, and using inputs from the plurality of movement sensors to determine a current path of the moving mobile platform.

16. The method of claim 13 wherein the movement sensor includes at least one of a gyroscope, an accelerometer, a compass, a pressure sensor or an altimeter.

17. The method of claim 13 wherein the information for a pre-defined and known path travelled by the mobile platform includes additional path information including at least one of speeds associated with a section of the path, locations of stations in the path, signals associated with the path, or times for scheduled stops in the path, the method further comprising using the additional path information for determining the current location of the mobile platform as it is moving along the pre-defined and known path.

18. The method of claim 13 wherein the at least one signal source is capable of providing identification information that identifies the signal source, the method further comprising using the identification information for determining the location of the mobile platform.

19. The method of claim 13 further comprising receiving information from the mobile platform including at least one of speed of the mobile platform, proximity of the mobile platform to a station, proximity of the mobile platform to a signal source, or the direction of a driver of the mobile platform, the method further comprising using the information from the mobile platform for determining the current location of the mobile platform along the pre-defined and known path.

20. The method of claim 13 wherein the plurality of configurable settings include at least one of filter settings, gain settings, network settings, activation settings, or mode settings.

* * * * *